US010621638B2

(12) United States Patent
D'Souza et al.

(10) Patent No.: US 10,621,638 B2
(45) Date of Patent: Apr. 14, 2020

(54) METHOD, APPARATUS, AND COMPUTER-READABLE MEDIUM FOR LEVERAGING REAL-TIME SALES VOLUME FOR CONDUCTING GROUP BUYS

(71) Applicant: Agora Intelligence, Inc., Santa Clara, CA (US)

(72) Inventors: Severo D'Souza, Santa Clara, CA (US); Patricia Frey, Grass Valley, CA (US); Payson Johnston, San Jose, CA (US); Shuo Zhang, Mt View, CA (US); Steven Lee, Cupertino, CA (US)

(73) Assignee: AGORA INTELLIGENCE, INC., Santa Clara, CA (US)

( * ) Notice: Subject to any disclaimer, the term of this patent is extended or adjusted under 35 U.S.C. 154(b) by 732 days.

(21) Appl. No.: 15/158,950

(22) Filed: May 19, 2016

(65) Prior Publication Data

US 2016/0343050 A1    Nov. 24, 2016

Related U.S. Application Data

(60) Provisional application No. 62/163,948, filed on May 19, 2015.

(51) Int. Cl.
*G06Q 30/00* (2012.01)
*G06F 17/30* (2006.01)
*G06Q 30/06* (2012.01)

(52) U.S. Cl.
CPC ............................. *G06Q 30/0605* (2013.01)

(58) Field of Classification Search
CPC .................................................. G06Q 30/0605
See application file for complete search history.

(56) References Cited

U.S. PATENT DOCUMENTS

| 6,604,089 B1 | 8/2003 | Van Horn et al. |
| 2013/0110597 A1 | 5/2013 | Blair et al. |
| 2013/0339169 A1 | 12/2013 | Perach |

(Continued)

OTHER PUBLICATIONS

Zhou, G., Xu, K., & Liao, S. S. Y. (2013). Do starting and ending effects in fixed-price group-buying differ? Electronic Commerce Research and Applications, 12(2), 78-89. doi:http://dx.doi.org/10.1016/j.elerap.2012.11.006.*

(Continued)

*Primary Examiner* — Kathleen Palavecino
(74) *Attorney, Agent, or Firm* — Amardeep S. Grewal; Reed Smith LLP

(57) ABSTRACT

A method, apparatus, and computer-readable medium for leveraging real-time sales volume for conducting group buys comprising initializing a sale of an item, the sale specifying a current price of the item which is calculated based on a current sales volume of the item and sales volume ranges, processing transactions with users for items at a purchase price equal to the current price when a purchase request is received from the corresponding user, terminating the sale of the item at a closing price when the current sales volume has reached a threshold or when a period of time has passed since the sale was initialized, and crediting accounts belonging to one or more users with an additional amount based at least in part on a difference between the closing price and the purchase price for each item for the corresponding user.

29 Claims, 17 Drawing Sheets

(56) References Cited

U.S. PATENT DOCUMENTS

2014/0129315 A1    5/2014   Neely et al.
2015/0019310 A1    1/2015   Young et al.
2017/0109767 A1*   4/2017   Shpanya ............ G06Q 30/0283

OTHER PUBLICATIONS

International Search Report and Written Opinion cited in corresponding International Application No. PCT/US2016/033204 dated Aug. 19, 2016.

* cited by examiner

Multiply sales volume by the closing price to generate a total sales amount

1401

Subtract the commission from the total sales amount to generate the seller payment amount

1402

Seller Payment Amount for Widget Sale =

(Sales Volume * Closing Price) - (Commission)

1501

Seller Payment Amount for Widget Sale =

(367 * $18) - ($798.61)

1502

Seller Payment Amount for Widget Sale =

$5807.39

1503

METHOD, APPARATUS, AND COMPUTER-READABLE MEDIUM FOR LEVERAGING REAL-TIME SALES VOLUME FOR CONDUCTING GROUP BUYS

RELATED APPLICATION DATA

This application claims priority to U.S. Provisional Application No. 62/163,948 filed May 19, 2015, the disclosure of which is hereby incorporated by reference in its entirety.

BACKGROUND

Group buying, also known as collective buying, offers products and services at significantly reduced prices on the condition that a minimum number of buyers make the purchase.

Typically, group buying websites negotiate a discount with a merchant or vendor of goods or services in exchange for a promise to deliver a higher volume of sales. For example, a merchant may agree to reduce the price of their product by 50 percent if they can be guaranteed at least 200 customers. In this case, potential purchaser could then offer to buy the merchant's product through a group website for the reduced price, and when 200 potential purchasers have accumulated, the "deal" would become active, resulting in at least 200 customers for merchant and a 50 percent savings for each of the customers.

One of the problems with existing group buying technology is that it does not work in real-time and is dependent on buyers getting together in order to buy a product. For example, in order to trigger a deal and make a discount available, a certain minimum number of potential buyers must opt-in. If this minimum number is not reached, then the deal is not triggered and the group purchase does not take place.

Another problem with existing group buying technology is that there is no way for a seller to adjust prices of an item once a particular deal has been made public, so they must offer steep discounts upfront in order to incentivize purchases by buyers. Once the minimum number of buyers is reached for a particular deal, the seller is usually locked into the deal sell price they previously agreed to, regardless of whether the item sells just 1 unit more than the minimum or 1,000 units more than the minimum. Additionally, since the transaction processing fees charged by group buying websites can be quite significant, sellers are frequently put in the position of achieving very minimal gains or incurring losses when the number of units sold is not significantly above the minimum.

Accordingly, improved systems and methods for group buying are needed which do not present as much risk for sellers and which allow for greater flexibility when performing group buying.

BRIEF DESCRIPTION OF THE DRAWINGS

FIG. 2 illustrates a vendor profile page according to an exemplary embodiment.

FIGS. 3A-3C illustrates a seller portal according to an exemplary embodiment.

DETAILED DESCRIPTION

While methods, apparatuses, and computer-readable media are described herein by way of examples and embodiments, those skilled in the art recognize that methods, apparatuses, and computer-readable media for leveraging real-time sales volume for conducting group buys are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

The Applicant has discovered systems and methods which allows for real-time crowd buying and dynamic pricing based on a volume of items currently sold. This enables sellers to adjust pricing in real-time or based on pre-determined thresholds in response to increasing sales volume and enables buyers to continue to receive price discounts beyond an initial deal-triggering discount.

Figure 1:
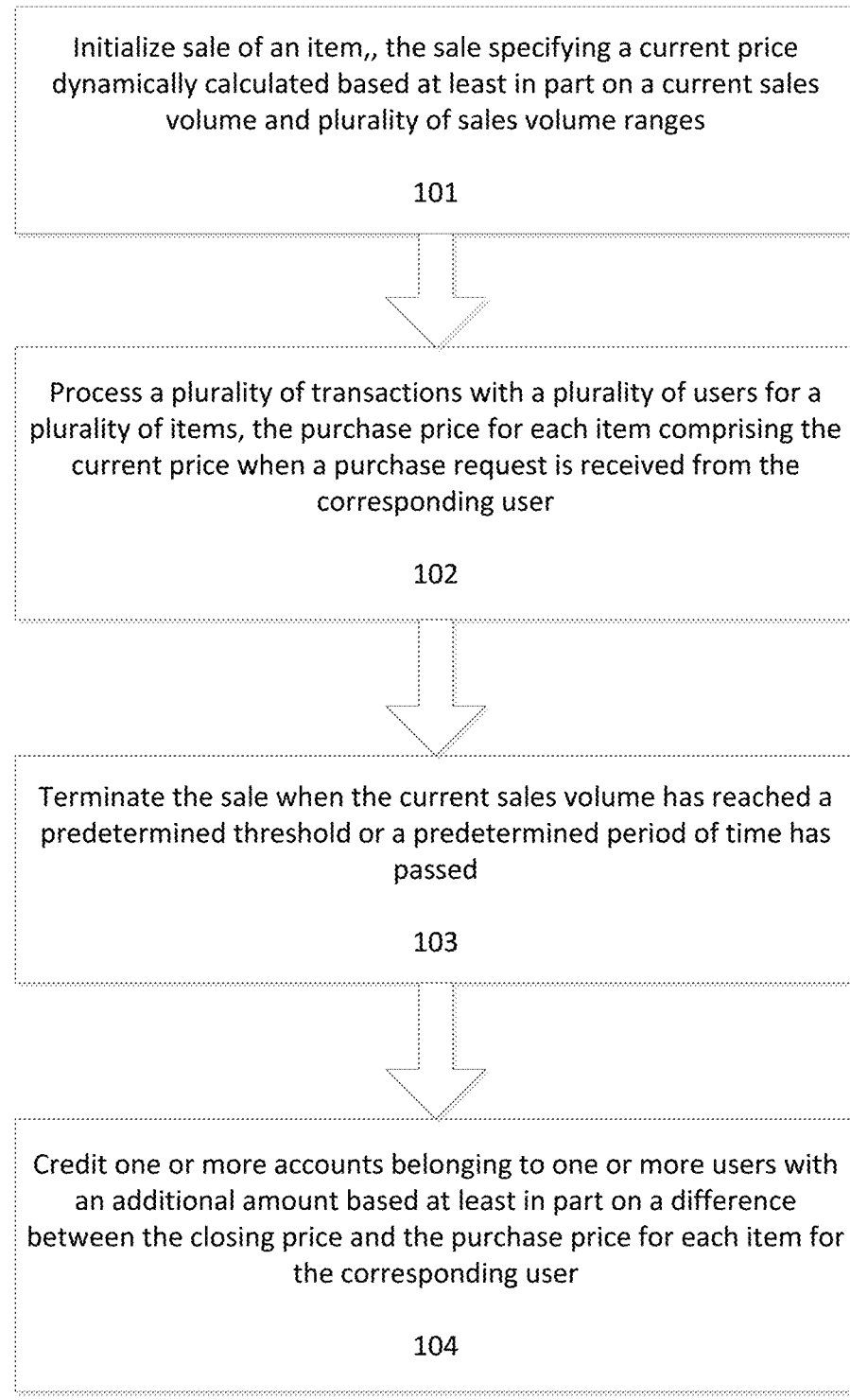
FIG. 1 illustrates a flowchart for leveraging real-time sales volume for conducting group buys according to an exemplary embodiment.

FIG. 1 illustrates a flowchart for leveraging real-time sales volume for conducting group buys according to an exemplary embodiment. At step 101 a sale of an item is initialized. The item can be a product, a service, a coupon for a product or service, and/or a certificate redeemable with a seller (such a retail establishment, restaurant, clothing store, service provider, vendor, and/or website) for a product or service. The sale specifies a current price of the item. As will be discussed in greater detail below, the current price is dynamically calculated for a duration of the sale based at least in part on a current sales volume of the item and a plurality of sales volume ranges.

The item (in the case of a certificate) or a description of the item (for products or services) can be provided by the seller of the item to a group buy website or service which administers the group buys disclosed herein, for example, by selecting the terms, monetary value, and/or item value of the item at a retail establishment or website belonging to the seller.

Figure 2:
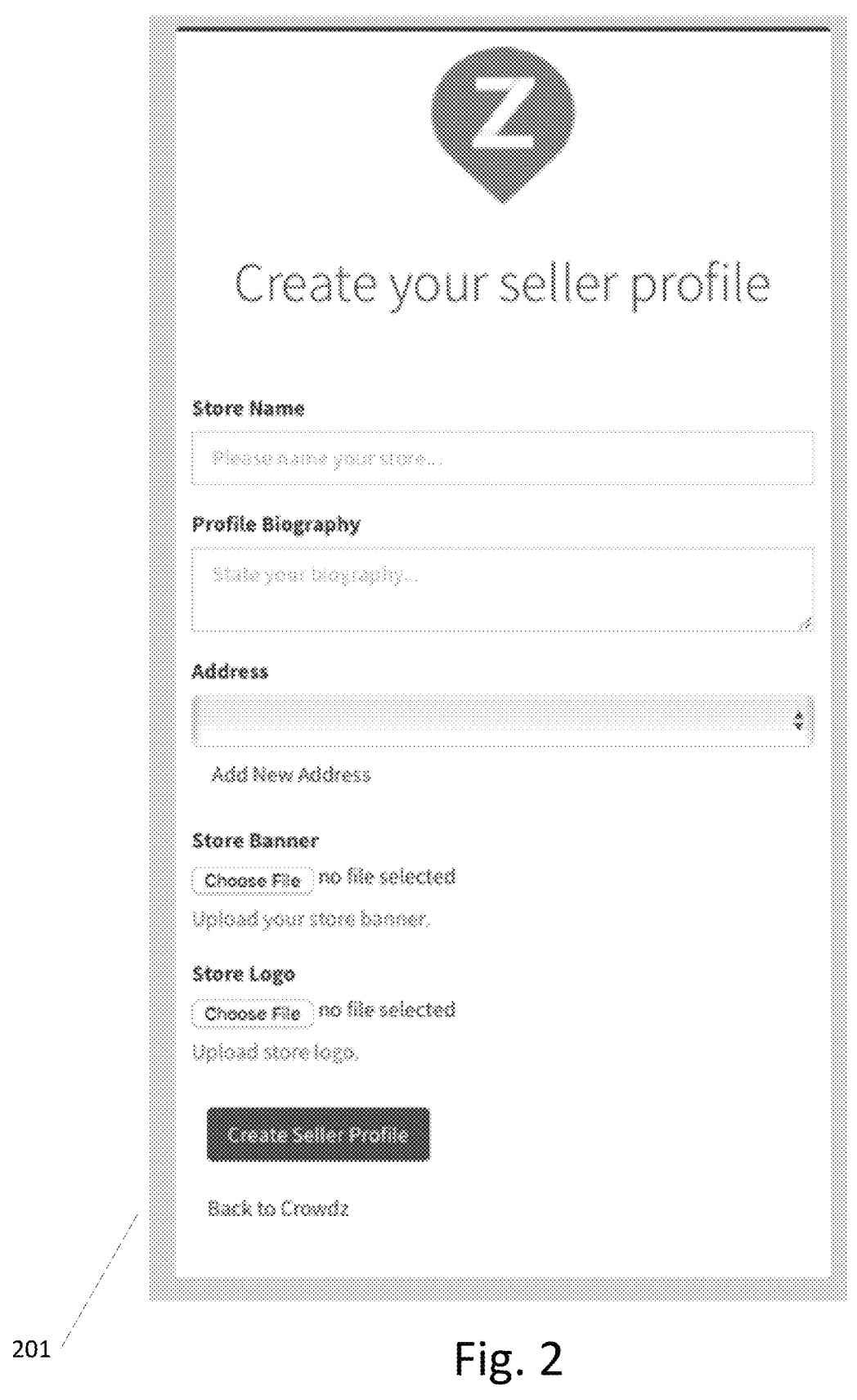

The seller can create a seller or vendor profile which enables them to issue items and participate in sales for the item on the group buy website or service. FIG. 2 illustrates a vendor profile page 201 in which a seller can enter information such as their store name, a profile biography which may be displayed to potential buyers, a bank name for receiving proceeds from a sale, a bank account number, an account number for the seller on the group buy website or service, a current address of the seller's establishment (if the seller has a brick and mortar store), a website of the seller (if the seller has a website), a store banner, and/or a store logo.

Figure 3A:
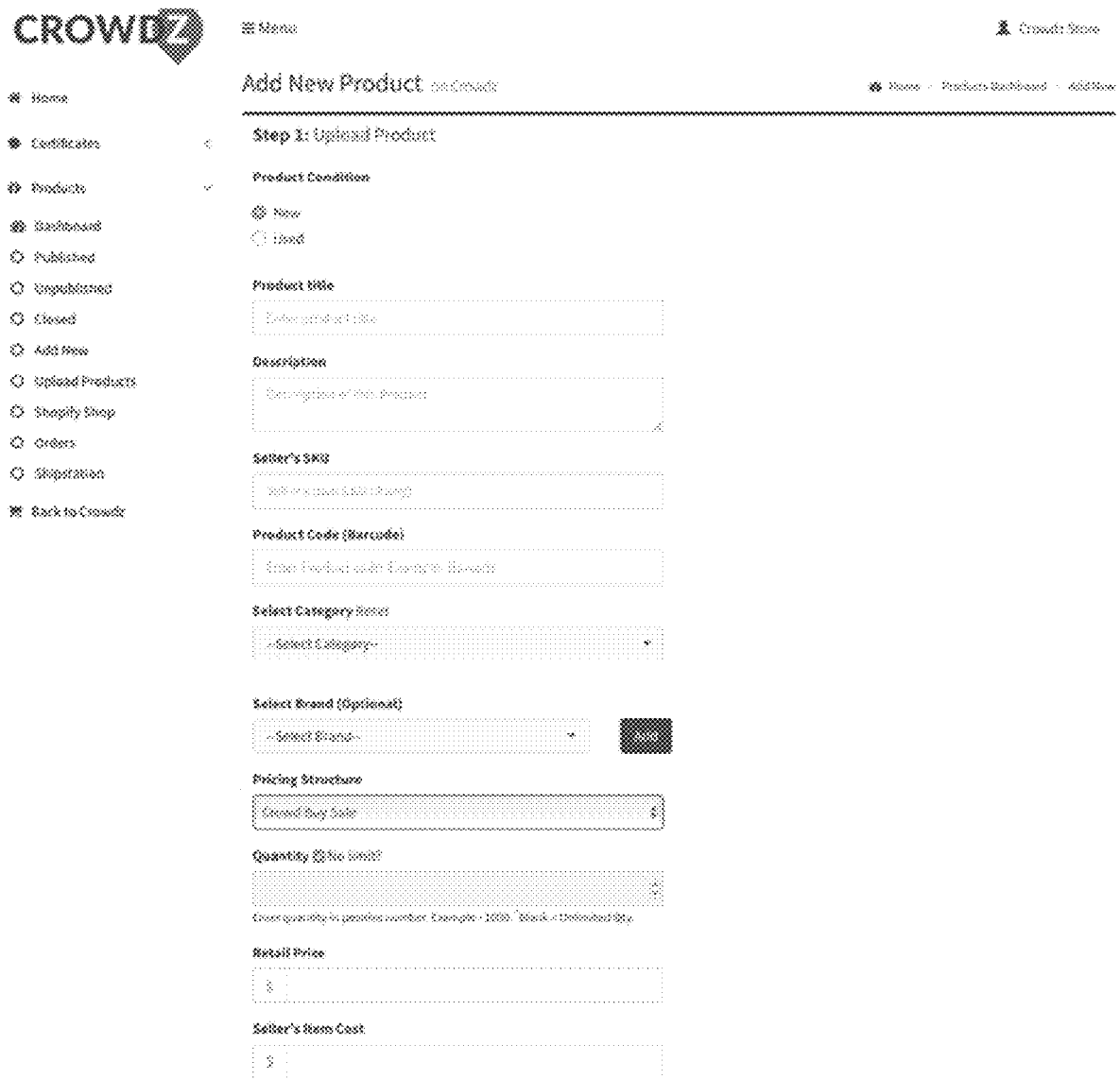
Figure 3B:
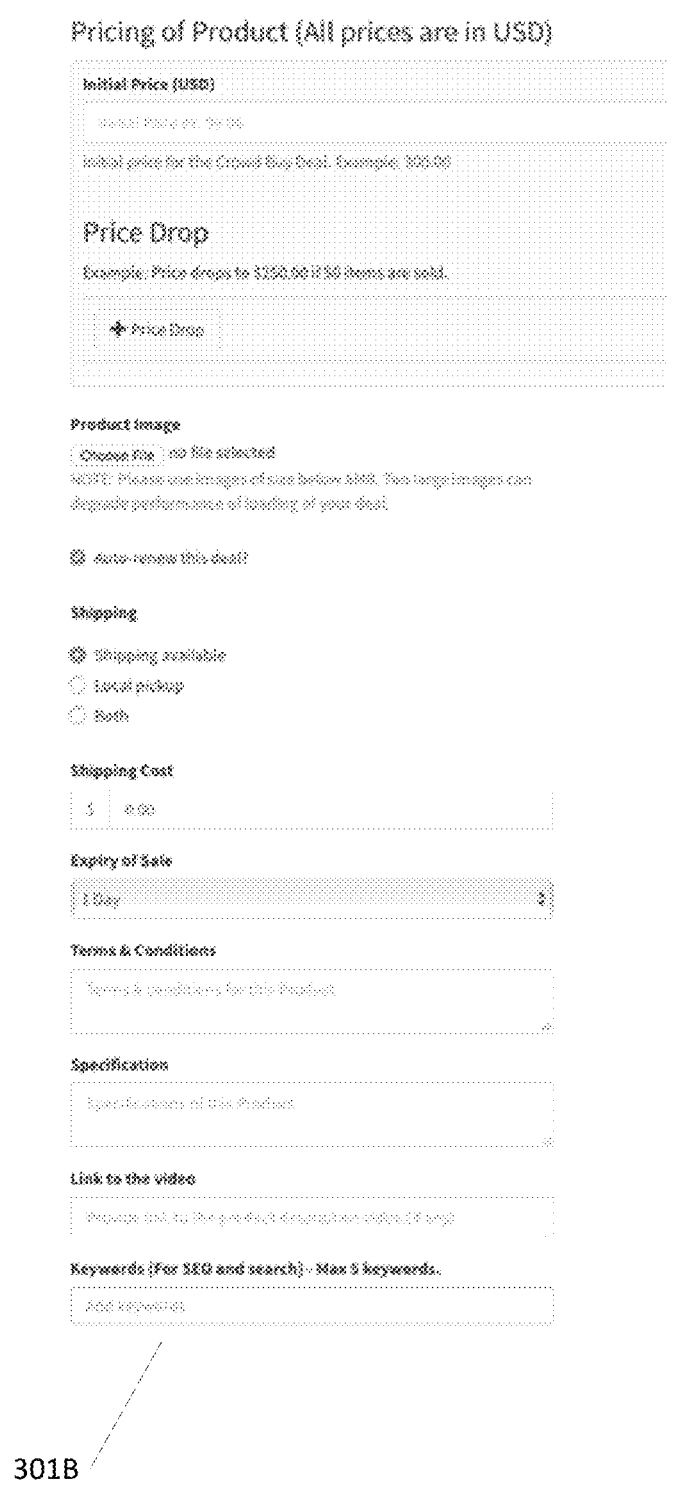
Figure 3C:
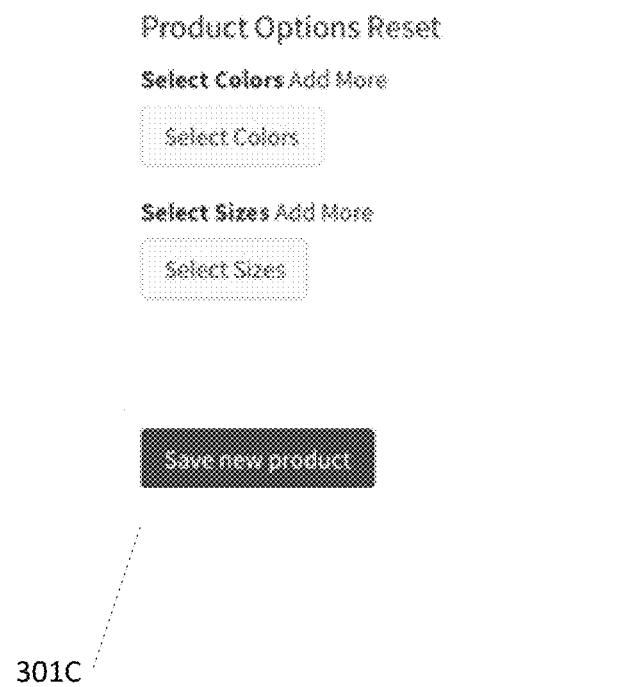

Referring to FIGS. 3A-3C, after the seller creates an account or a profile, they can utilize a seller portal 301A-30C to perform a variety of functions. For example, the seller can view a dashboard providing an overview of past sales and returns, view their published items (which are still part of a sale), view their unpublished items (which have not been offered for sale yet), view their closed items (for which the sale has been completed and/or which have expired), add a new item, manage their previous item or sale orders, view the redemption history of their items, and view reviews of their items by buyers.

As shown in the interfaces 301A, 301B, and 301C in FIGS. 3A-3C, if the user is adding a product as an item, the seller can select a product title, a product description, a specification of the product (indicating what the buyer is entitled to), a product category, a brand, which type of pricing structure they would like to use for the sale (such as a one-time sale or a volume discount based sale), a product retail price, a quantity of products to sell, an expiration date of the sale, and any terms and conditions associated with the product.

When the seller selects a volume discount based sale, the current price of an item is dynamically calculated for a duration of the sale based at least in part on a current sales volume of the item and a plurality of sales volume ranges which are provided by the seller. Each sales volume range in the plurality of sales volume ranges has a corresponding price which is also provided by the seller and which can be triggered when the current sales volume for the item enters the associated sales volume range.

Sellers can utilize these sales volume ranges and the corresponding prices for each sales volume range to trigger price drops based upon certain volume thresholds which they have defined. This enables sellers to continue to lower prices in real-time during a sale based on the volume of items purchased.

Figure 4:
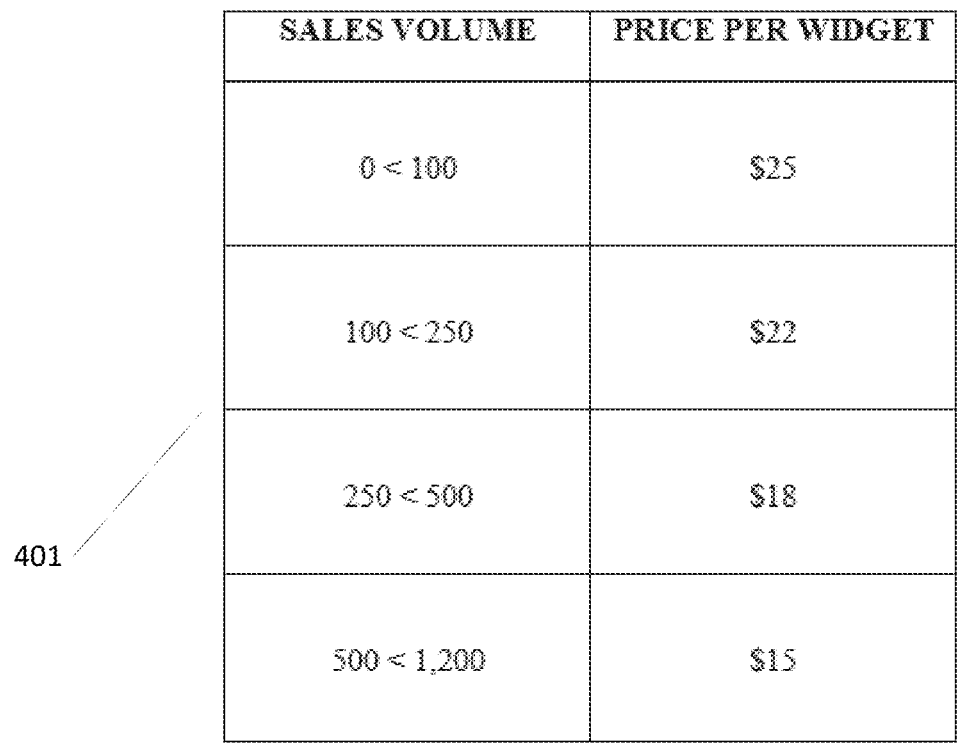
FIG. 4 illustrates an example of sales volume thresholds for widgets.

FIG. 4 illustrates an example of sales volume thresholds for widgets (or widget certificates). As shown in the table 401 of FIG. 4, the first sales volume range of 0 to 100 (non-inclusive) corresponds to a price per widget of $25, the second sales volume range of 100 to 250 widgets (non-inclusive) corresponds to a price per widget of $22, the third sales volume range of 250 to 500 widgets (non-inclusive) corresponds to a price per widget of $18, and the fourth sales volume range of 500 to 1,200 widgets (non-inclusive) corresponds to a price per widget of $15. In this case, the seller of the widgets can have specified that no more than 1,999 widgets are to be sold (due to production constraints).

Figure 5:
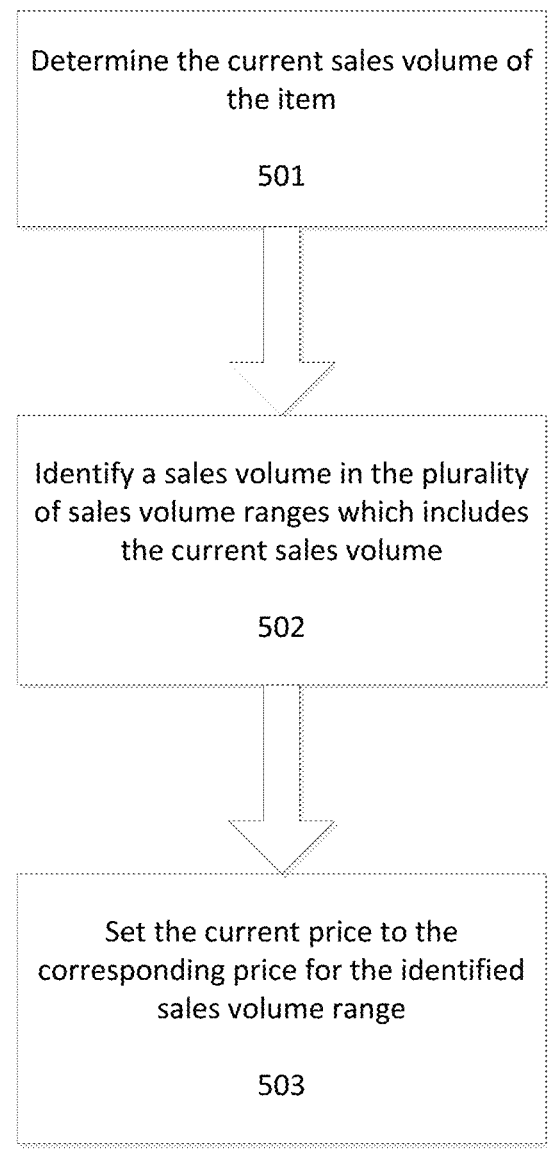
FIG. 5 illustrates a flowchart for dynamically calculating a current price according to an exemplary embodiment.

FIG. 5 illustrates a flowchart for dynamically calculating a current price of the item at any given time for a duration of the sale based at least in part on a current sales volume of the item and a plurality of sales volume ranges according to an exemplary embodiment.

Figure 6:
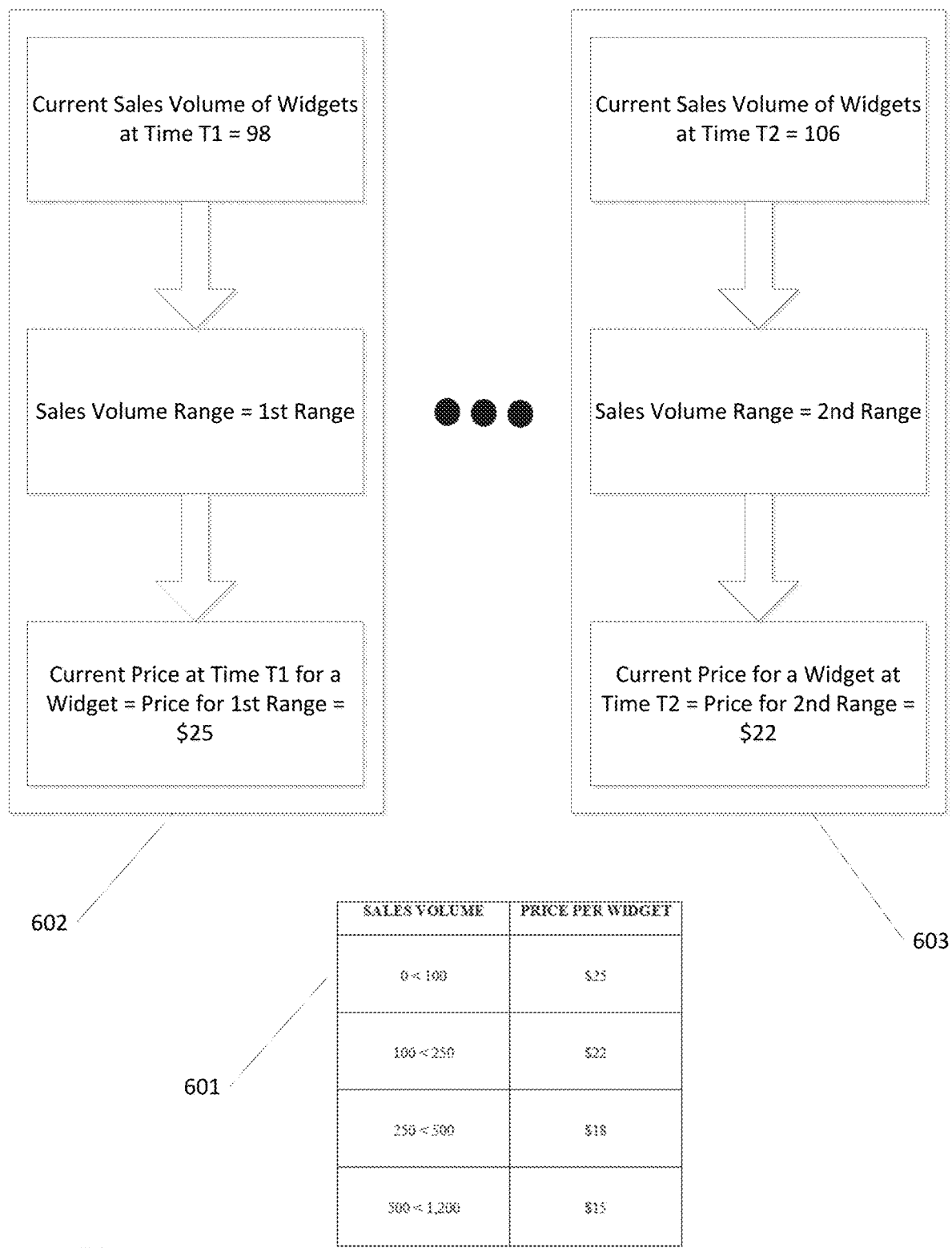
FIG. 6 illustrates the process for determining a current sales price at two different points in time using the example of widgets.

At step 501 the current sales volume of the item is determined. This information can be tracked by the group buy website or service. At step 502 a sales volume range in the plurality of sales volume ranges which includes the current sales volume is identified. At step 503 the current price is set to the corresponding price for the identified sales volume range FIG. 6 illustrates the process for determining a current sales price at two different points in time using the example of widgets from FIG. 4. Table 601 illustrates the sales volume ranges previously discussed with regard to FIG. 4. Flowchart 602 illustrates how the current price at time T1 is determined and flowchart 603 illustrates how the current price at time T2 is determined.

As shown in flowchart 602, the current sales volume at time T1 is 98. Therefore, the sales volume range is the first range and the current price is set to the corresponding price for the first sales volume range, which is $25. Similarly, as shown in flowchart 603, the current sales volume at time T2 is 106. Therefore, the sales volume range is the second range and the current price is set to the corresponding price for the second sales volume range, which is $22.

Returning to FIG. 1, at step 102 a plurality of transactions are processed with a plurality of users for a plurality of items. Each user can purchase a single item or multiple items. The purchase price for each item in the plurality of plurality of items comprises the current price when a purchase request is received from the corresponding user.

Figure 7:
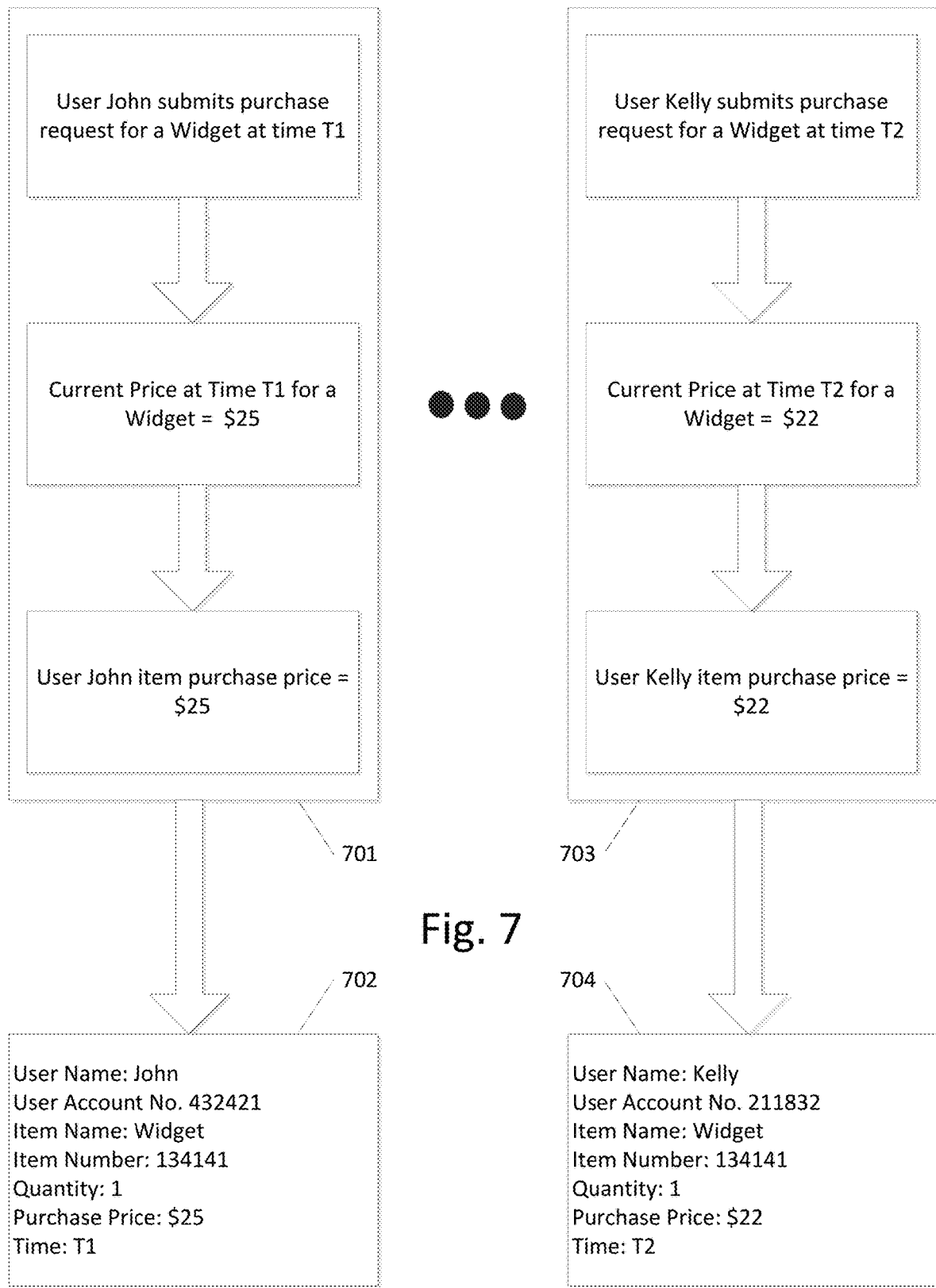
FIG. 7 illustrates an example of two transactions processed at times T1 and T2 during the sale of the widgets.

FIG. 7 illustrates an example of two transactions processed at times T1 and T2 during the sale of the widgets previously discussed. As shown in flowchart 701, when user John submits a purchase request for a widget at time T1, since the current price at time T1 for a widget is $25, then the item purchase price for user John is $25. This transaction information can be recorded in a data structure or record, such as object 702, which records a user name, a user account number, an item name, an item number, a quantity purchased, a purchase price, and a timestamp of the time of purchase.

Similarly, as shown in flowchart 703, when user Kelly submits a purchase request for a widget at time T2, since the current price at time T2 for a widget is $22, then the item purchase price for user John is $22. This transaction information can be recorded in a data structure or record, such as object 704, which records a user name, a user account number, an item name, an item number, a quantity purchased, a purchase price, and a timestamp of the time of purchase.

Figure 8:
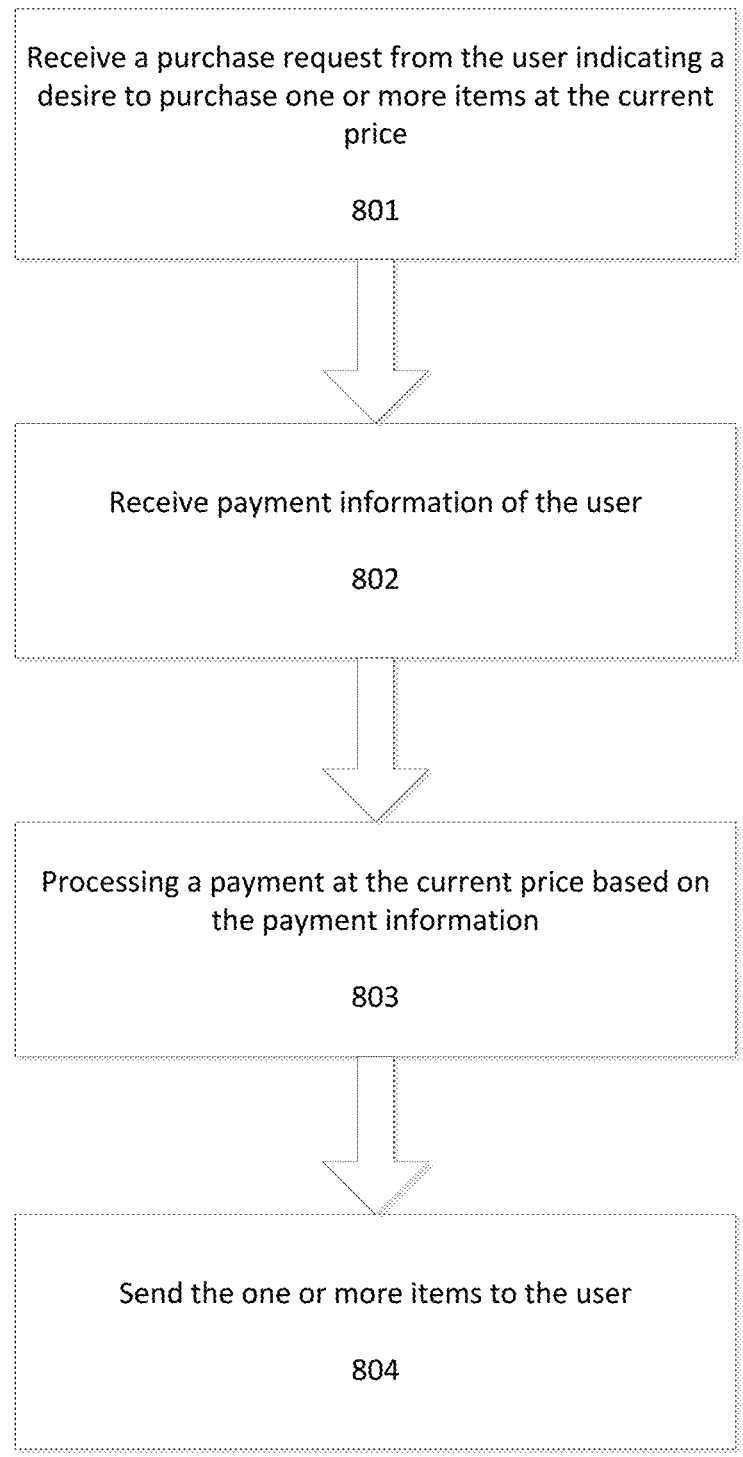
FIG. 8 illustrates a flowchart for processing a plurality of transactions with a plurality of users for a plurality of item according to an exemplary embodiment.

FIG. 8 illustrates a flowchart for processing a plurality of transactions with a plurality of users for a plurality of item according to an exemplary embodiment. The steps in the flowchart of FIG. 8 are performed for each transaction with each user.

At step 801 a purchase request is received from the user indicating a desire to purchase one or more items at the current price. The purchase request can be received via an Application Programming Interface associated with an account belonging to the user (such as an account with the group buying site or with a social media site linked to the group buying site). In response to receiving the purchase request, the system can solicit payment information from the user. Alternatively, the user can simply provide the payment information along with the request (such as by using a prepaid wallet or service).

At step 802 payment information of the user is received. The payment information can include a credit card, debit card, wallet account, paypal account, checking account number, bank account, bitcoin, or any other payment type.

At step 803 a payment is processed at the current price based on the payment information. For example, the user's credit card can be charged the amount of the current price. At step 804 the one or more items are sent to the user. When the item is a certificate or coupon, the item can be electronically transmitted to the user and include a barcode or two-dimensional barcode such as a Quick Response code which can be scanned by the seller of the item when the user wishes to redeem the item for the particular products and/or services being offered. This step can be contingent on the payment processing step completing successfully. If the item is a product, then the sending step can include initiating shipment of the product to an address of the user.

Returning to FIG. 1, at step 103 the sale of the item is terminated based at least in part on a determination that the current sales volume has reached a predetermined threshold or a determination that a predetermined period of time has passed since the sale was initialized, wherein the current price at termination of the sale comprises the closing price. The seller can designate the termination conditions for each sale of each item. For example, the seller can indicate that the sale should end once a predetermined period of time has passed (such as two weeks) and/or can indicate that the sale should end once a predetermined amount of items have been sold (such as 2000 items). Of course, the seller can utilize both of these conditions at the same time (e.g. end sale when 1000 items sold or five days have passed).

At step 104 one or more accounts belonging to one or more users in the plurality of users are credited with an additional amount, wherein the additional amount for each account in the one or more accounts is based at least in part on a difference between the closing price and the purchase price for each item for the corresponding user.

Figure 9:
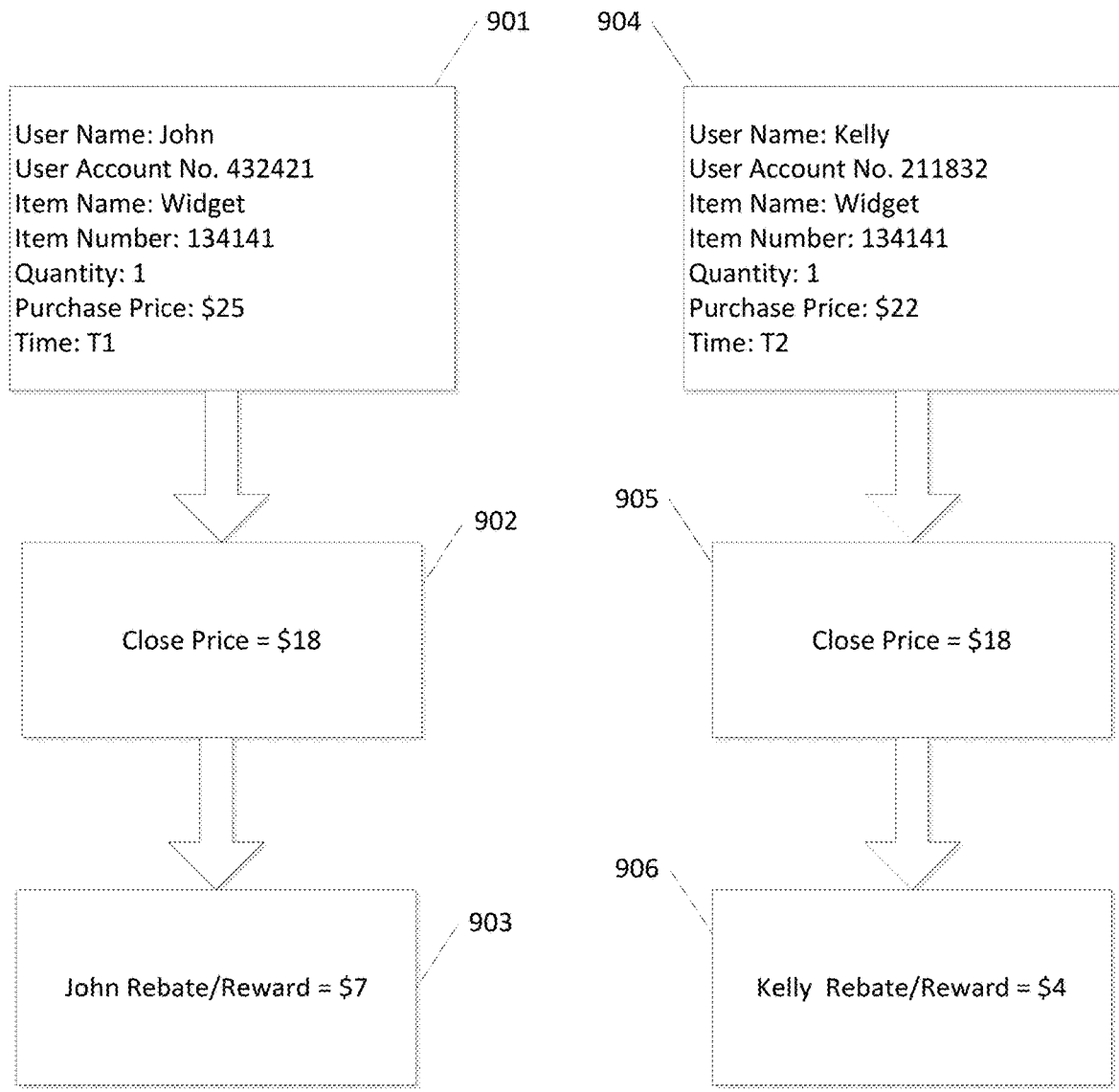
FIG. 9 illustrates an example of rebates/rewards issued to two buyers of widgets.

This additional amount can be equal to the difference between the purchase price for an item (the price the user paid) and the closing price (the price the item was available for when the sale ended). For example, referring to FIG. 9, since the purchase record for user John 901 indicates that his purchase price was $25 and the close price 902 was $18, then user John would be issued a reward or rebate in the amount of $7, indicated by numeral 903. Similarly, since the purchase record for user Kelly 904 indicates that her purchase price was $25 and the close price 905 was $18, then user Kelly would be issued a reward or rebate in the amount of $4, indicated by numeral 906.

Additionally, rebates can be offered in real-time prior to the end of the sale when the price of the item drops. For example, a first rebate can be offered when the price drops below a purchase price, and a second rebate can then be offered if the price drops further prior to the end of the sale.

The user account can be an account associated with the group buy website or service and the user can utilize the credits the same way they would any other payment type. For example, the user can spend on the credits on other sales available through the group buy website or service. Alternatively, the additional amount can be transmitted to the user in the form of a cash or credit card refund.

This structure provides an incentive to purchasers/users to share information regarding the sale with friends (such as by linking to the sale on social media or in an email or via an internal message using the group buy website or service), since the greater the sales volume of a particular item, the lower the ultimate closing price, and the greater the additional amount that is credited back to a user who purchased the item early.

Figure 10:
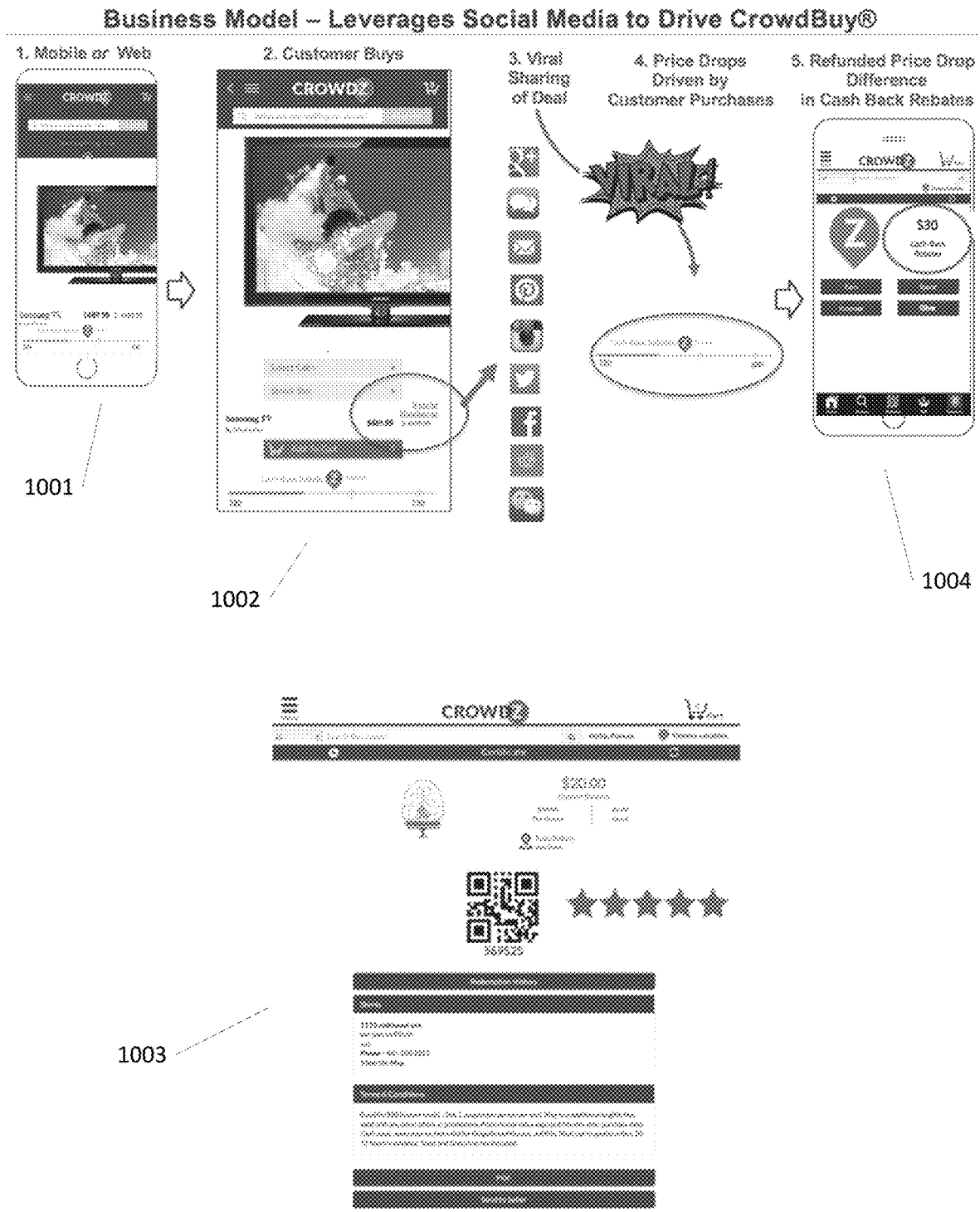
FIG. 10 illustrates various interfaces which are part of the buyer/user experience according to an exemplary embodiment.

FIG. 10 illustrates various interfaces which are part of the buyer/user experience and which can be available to the buyer through a buyer portal on the group buy website or service, application, or mobile app on a mobile device. As shown in interface 1001, the user can select a particular sale they are interested in.

Interface 1002 illustrates how a user can submit a request indicating they would like to purchase a particular item, in this case a television. By adding the item to their cart and checking out, the user joins the deal and acquires the item at the current price.

As shown in interface 1003, the user can bring up a purchased certificate on their device and confirm that they would like to utilize the certificate prior to redemption. Once the user confirms that they would like to use the certificate, the bar code for the item can be displayed on their device and can be scanned by the seller to confirm that the item is valid. Additionally, after using the certificate, the user can be prompted to leave feedback regarding their experience with the seller establishment, the group buy website or service, or any aspect of item (such as the perceived value). The user does not have to wait until the end of sale to utilize the certificate, as it is sent to their device immediately after purchase. If the item is a product or does not require a barcode (such as a QR code), then the item can be drop shipped to the user after purchase. For example, if the item is for services at a particular auto-garage, then a voucher for the services can be mailed to the user's address. Alternatively, the voucher can be electronically transmitted to a user email address or to the user's account with the group buy website or service.

Interface 1004 illustrates that the user received rewards/rebates resulting from a closing price of the item being lower than the purchase price they paid for the item. As shown in interface 1004, the user can spend or gift the reward/rebate credit. For example, the user can purchase another item with the reward/rebate credit or send it to another member of the group buy site to use themselves, or they can pull it out in cash via a bank draft.

Figure 11:
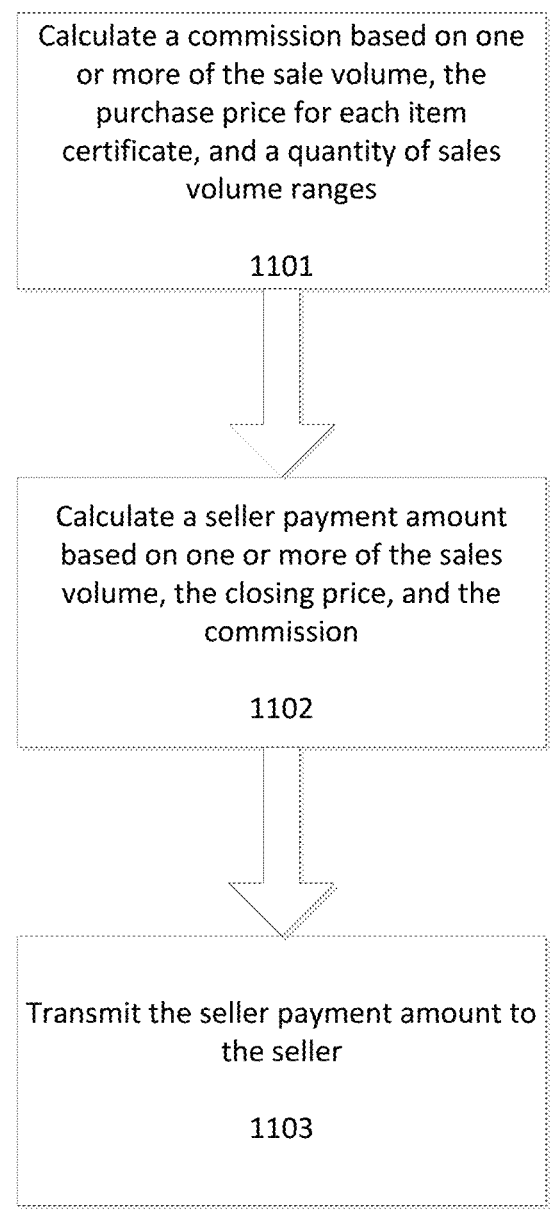
FIG. 11 illustrates a flowchart for computing post sale payouts according to an exemplary embodiment.

Once the sale has completed, the seller can be paid a seller payment and the group buy website or service can collect a commission for facilitating the sale of the items. FIG. 11 illustrates a flowchart for computing post sale payouts according to an exemplary embodiment.

At step 1101 a commission is calculated based at least in part on one or more of the sales volume, the purchase price for each item, and a quantity of sales volume ranges. At step 1102 a seller payment amount is calculated based at least in part on one or more of the sales volume, the closing price, and the commission and at step 1103 the seller payment amount is transmitted to the seller.

Figure 12:
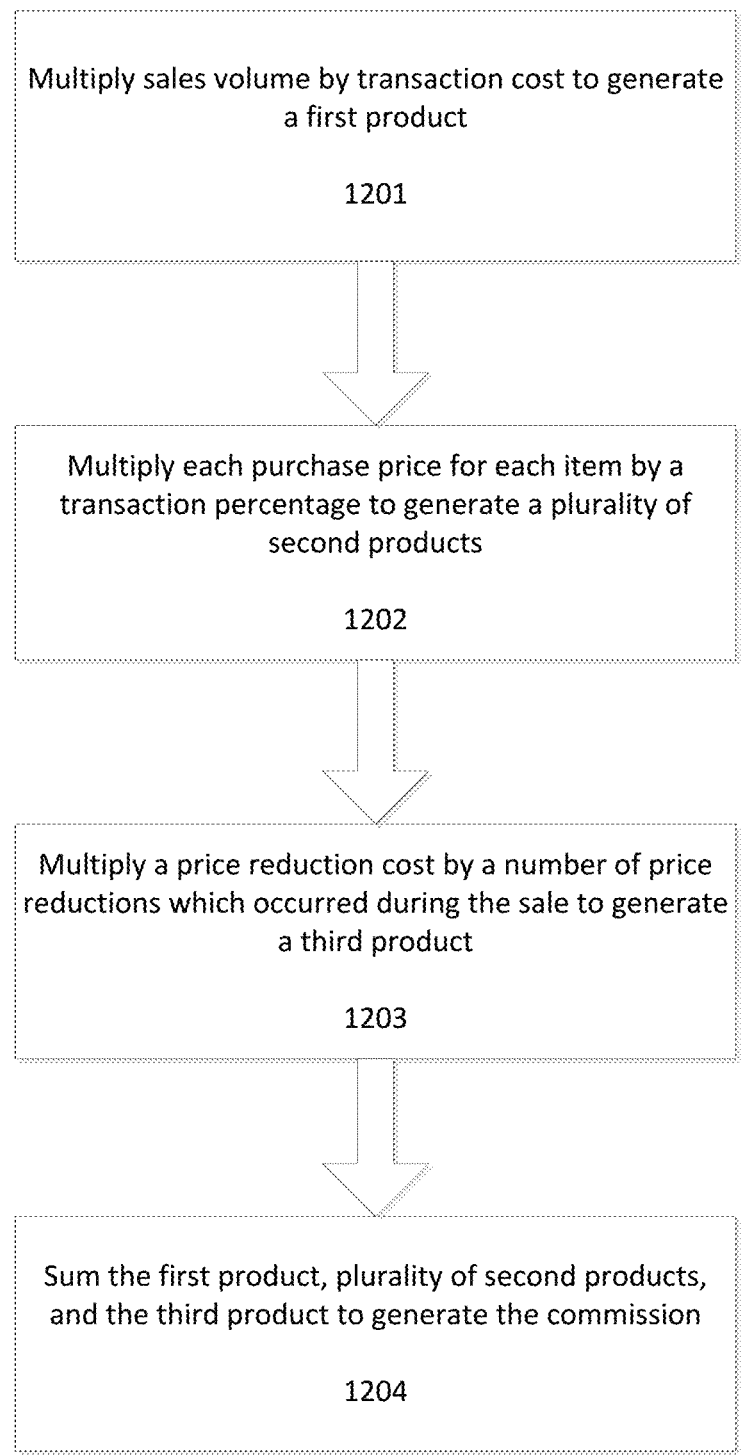
FIG. 12 illustrates a flowchart for calculating a commission according to an exemplary embodiment.

FIG. 12 illustrates a flowchart for calculating a commission according to an exemplary embodiment. At step 1201 the sales volume is multiplied by a transaction cost to generate a first product. At step 1202 each purchase price for each item is multiplied by a transaction percentage to generate a plurality of second products. At step 1203 a price reduction cost is multiplied by a number of price reductions which occurred during the sale to generate a third product. Alternatively, the price reduction cost can be multiplied by the number of price reductions specified by the seller when they created the sale to generate the third product. For example, if the seller created the sale with four price volume ranges, indicating three possible price reductions from the initial price, and the sale ended after only two price reductions, the seller could still be charged for all three price reductions since that was the configuration they chose when setting up the sale. At step 1204 the first product, the plurality of second products, and the third product are summed to generate the commission.

Figure 13:
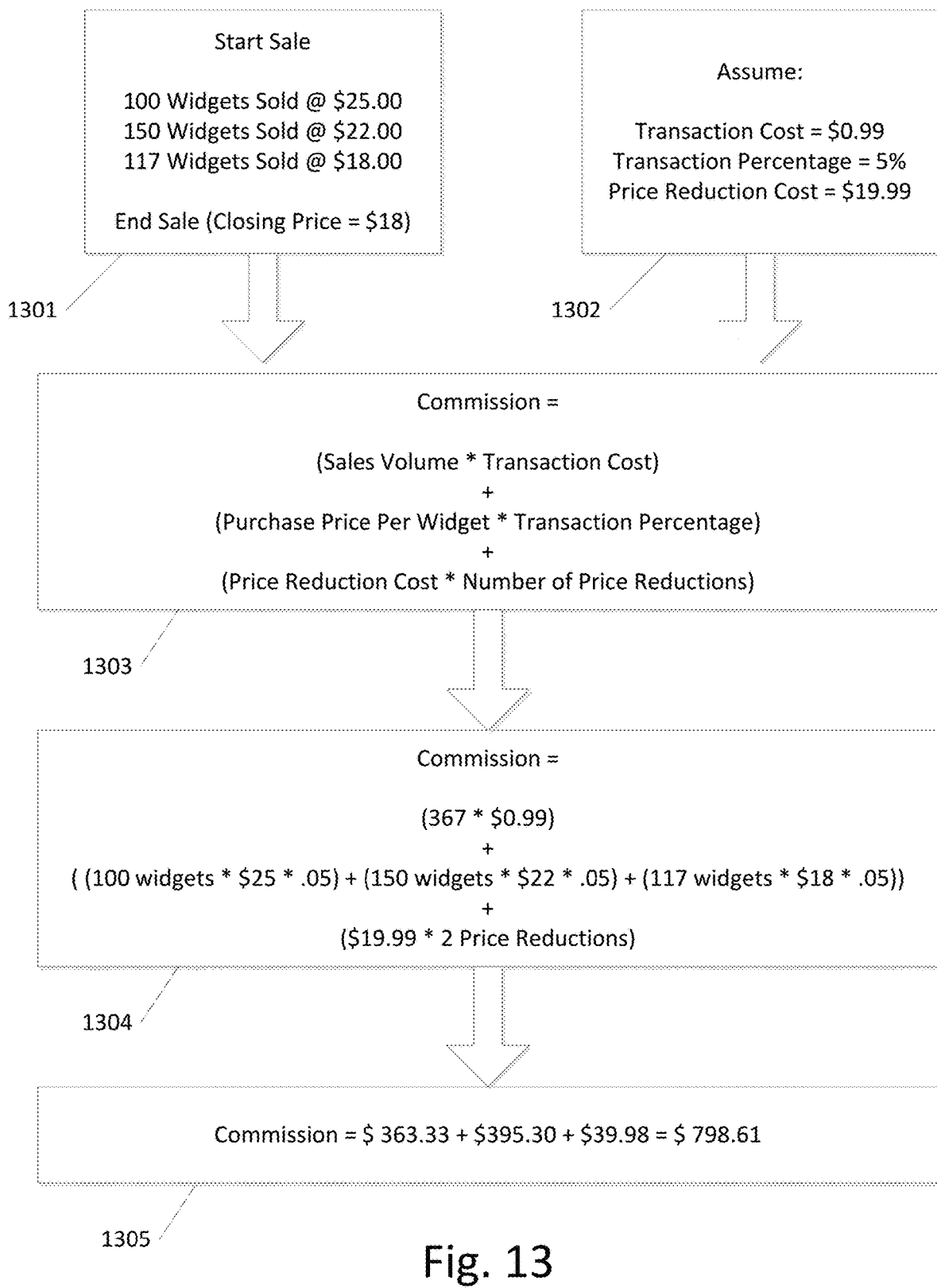
FIG. 13 illustrates an example of a commission calculation using hypothetical numbers for the sale of widgets.

FIG. 13 illustrates an example of a commission calculation using hypothetical numbers for the sale of widgets. Box 1301 illustrates the sales numbers for a hypothetical sale of widgets. As shown in box 1301, 100 widgets were sold at $25, 150 widgets were sold at $22, and 117 widgets were sold at $18. The sale then ended, resulting in a closing price of $18.

Box 1302 illustrates some hypothetical costs associated with the sale. As shown in box 1302, the transaction cost is assumed to be 99 cents, the transaction percentage is assumed to be 5%, and the price reduction cost is assumed to be $19.99 (price reduction costs determined per seller or industry, in many cases sellers are not charged for price drops based on product/industry).

Box 1303 illustrates the variables that comprise each of the products which will be summed to compute the total commission for the sale and box 1304 illustrates the actual numbers from boxes 1301 and 1302 plugged into the variables of box 1303. When the final computation is complete, the total commission is determined to be $798.61, as shown in box 1305.

Figure 14:
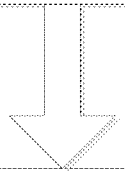
FIG. 14 illustrates a flowchart for calculating the total seller payment amount according to an exemplary embodiment.

FIG. 14 illustrates a flowchart for calculating the total seller payment amount according to an exemplary embodiment. At step 1401 the sales volume is multiplied by the closing price to generate a total sales amount and at step 1402 the commission is subtracted from the total sales amount to generate the seller payment amount. The seller payment amount is then transmitted to the seller.

Figure 15:
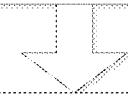
FIG. 15 illustrates an example of calculating the total seller payment amount for the seller of widgets.
Figure 15:
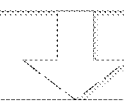

FIG. 15 illustrates an example of calculating the total seller payment amount for the seller of widgets previously discussed and based on the numbers shown in FIG. 13. Box 1501 illustrates the variables used to calculate the total seller payment amount, box 1502 illustrates the values of the actual variables based on the example of FIG. 13, and box 1503 illustrates the total seller payment amount for the widget sale. This amount can be transmitted to the seller bank account specified in the seller profile as revenue from the sale of the widgets. Alternatively, the seller payment can be paid out at the time of price drops. If this happens sellers are paid at the lowest price threshold and rebated the difference if the additional volume price drops are not reached.

The methods, systems, and computer-readable medium for leveraging real-time sales volume for conducting group buys disclosed herein offer a number of technical advantages.

The mobile application of group buying can be utilized to leverage physical buys as part of the crowdbuy deals and can be determined by actual presence of the mobile phone using iBeacon™ and other similar technology. For example, a user having a mobile device with location and proximity detection software can make a physical purchase of an item at a retail location and enter the purchase into a mobile crowdbuy application on the user's mobile device. The mobile application can integrate the physical purchase into a particular crowdbuy offer, thereby giving the user an opportunity to claim a rebate if the closing price of the item is below the purchase price.

The automation of group buying also allows for an analytics system to have a deeper understanding of pricing trends and motivations, which in turn provide the framework and foundation for business recommendations and analytics.

The dynamic pricing engine creates a framework for efficiently pricing services and products across physical locations and globally. Pricing can move up or down based on demand in specific locations and can be aggregated globally to create an efficient market for pricing goods and services across the world in both ecommerce and physical applications.

Additionally, the present system enables real-time payment of rebates at price drops, instead of waiting via mail at a future date. The current system offers "rebates" back to the customer that are not yet realized when the customer buys a product, because the rebate is generated at the end of the crowdbuy deal or at a specific price drop. The technology presented herein utilizes specific algorithms that calculate the rebate values in real time and credit the rebate back to the customer if the customer's purchase price is higher than the current price offering (whether during the open crowd buy deal or when the deal closes).

Figure 16:
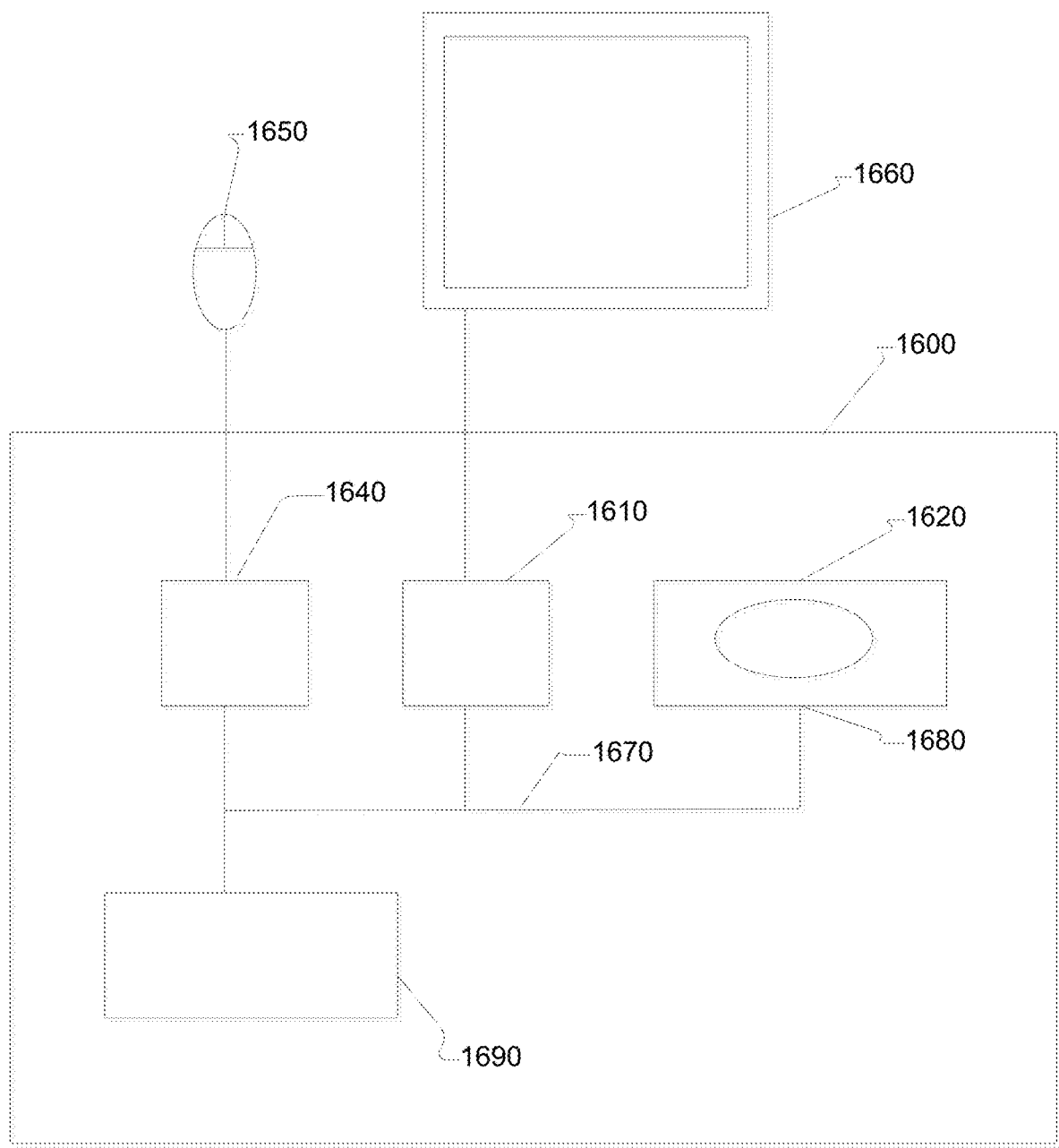
FIG. 16 illustrates an exemplary computing environment that can be used to carry out the method for transmitting surveillance-related data over a power line according to an exemplary embodiment.

One or more of the above-described techniques can be implemented in or involve one or more computer systems. FIG. 16 illustrates a generalized example of a computing environment 1600. The computing environment 1600 is not intended to suggest any limitation as to scope of use or functionality of a described embodiment. For example, the computing environment can include one or more computers, mobile devices, tablets, portable computing devices such as smart watches, etc.

With reference to FIG. 16, the computing environment 1600 includes at least one processing unit 1610 and memory 1620. The processing unit 1610 executes computer-executable instructions and may be a real or a virtual processor. In a multi-processing system, multiple processing units execute computer-executable instructions to increase processing power. The memory 1620 may be volatile memory (e.g., registers, cache, RAM), non-volatile memory (e.g., ROM, EEPROM, flash memory, etc.), or some combination of the two. The memory 1620 may store software instructions 1680 for implementing the described techniques when executed by one or more processors. Memory 1620 can be one memory device or multiple memory devices.

A computing environment may have additional features. For example, the computing environment 1600 includes storage 1640, one or more input devices 1650, one or more output devices 1660, and one or more communication connections 1690. An interconnection mechanism 1670, such as a bus, controller, or network interconnects the components of the computing environment 1600. Typically, operating system software or firmware (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and which can be accessed within the computing environment 1600. The storage 1640 may store instructions for the software 1680.

The input device(s) 1650 may be a touch input device such as a keyboard, mouse, pen, trackball, touch screen, or game controller, a voice input device, a scanning device, a digital camera, remote control, or another device that provides input to the computing environment 1600. The output device(s) 1660 may be a display, television, monitor, printer, speaker, or another device that provides output from the computing environment 1600.

The communication connection(s) 1690 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1600, computer-readable media include memory 1620, storage 1640, communication media, and combinations of any of the above.

Of course, FIG. 16 illustrates computing environment 1600, display device 1660, and input device 1650 as separate devices for ease of identification only. Computing environment 1600, display device 1660, and input device 1650 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1600 may be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more server-side computing devices on a computer network for leveraging real-time sales volume for conducting group buys, the method comprising:
    initializing, by at least one of the one or more server-side computing devices, a sale of an item over the computer network, wherein the sale specifies a current price of the item;
    updating, by at least one of the one or more server-side computing devices, the current price of the item for a duration of the sale by detecting real-time sales volume of the item on the computer network, wherein the current price is dynamically determined based at least in part on the real-time sales volume and a data structure stored on at least one of the one or more server-side computing devices, the data structure comprising a plurality of sales volume ranges;
    processing, by at least one of the one or more server-side computing devices, a plurality of transactions with a plurality of users for a plurality of items prior to termination of the sale of the item, wherein a purchase price for each item in the plurality of plurality of items comprises the current price when a purchase request is received from the corresponding user;
    terminating, by at least one of the one or more server-side computing devices, the sale of the item based at least in part on one or more of a determination that the current sales volume has reached a predetermined threshold or a determination that a predetermined period of time has passed since the sale was initialized, wherein the current price at termination of the sale comprises the closing price; and
    crediting, by at least one of the one or more server-side computing devices, after processing the plurality of transactions and after termination of the sale of the item, one or more accounts belonging to one or more users in the plurality of users with an additional amount, wherein the additional amount for each account in the one or more accounts is based at least in part on a difference between the closing price and the purchase price for each item for the corresponding user.

2. The method of claim 1, wherein each sales volume range in the plurality of sales volume ranges has a corresponding price and wherein the current price is calculated by:
    determining the current sales volume of the item;
    identifying a sales volume range in the plurality of sales volume ranges which includes the current sales volume; and
    setting the current price to the corresponding price for the identified sales volume range.

3. The method of claim 1, wherein processing a plurality of transactions with a plurality of users for a plurality of item comprises, for each transaction and each user:
    receiving a purchase request from the user indicating a desire to purchase one or more items at the current price;
    receiving payment information of the user;
    processing a payment at the current price based on the payment information; and
    transmitting the one or more items to the user.

4. The method of claim 3, wherein the purchase request is received via an Application Programming Interface associated with an account belonging to the user.

5. The method of claim 1, further comprising:
    calculating, by at least one of the one or more computing devices, a commission based at least in part on one or more of the sales volume, the purchase price for each item, and a quantity of sales volume ranges;
    calculating, by at least one of the one or more computing devices, a seller payment amount based at least in part on one or more of the sales volume, the closing price, and the commission; and
    transmitting, by at least one of the one or more computing devices, the seller payment amount to a seller of the item.

6. The method of claim 5, wherein calculating a commission comprises:
    multiplying the sales volume by a transaction cost to generate a first product;

multiplying each purchase price for each item by a transaction percentage to generate a plurality of second products;

multiplying a price reduction cost by a number of price reductions which occurred during the sale to generate a third product; and summing the first product, the plurality of second products, and the third product to generate the commission.

7. The method of claim 5, wherein calculating a seller payment amount comprises:

multiplying the sales volume by the closing price to generate a total sales amount; and subtracting the commission from the total sales amount to generate the seller payment amount.

8. The method of claim 1, wherein the item comprises one or more of a product, a service, a coupon for a product or service, and a certificate redeemable with a seller for a product or service.

9. The method of claim 1, wherein detecting real-time sales volume of the item on the computer network comprises aggregating real-time sales volume from a plurality of sources.

10. The method of claim 9, wherein the plurality of sources comprise one or more of: a merchant server communicatively coupled to one or more point-of-sale locations, a social media server, or an ecommerce server.

11. The method of claim 1, wherein detecting real-time sales volume of the item on the computer network comprises:

receiving sales transaction information corresponding to a sale occurring at a point-of-sale location from a mobile device, the point-of-sale location including a beacon configured to transmit a notification to the mobile device instructing a user of the mobile device to enter the sales transaction information.

12. A server-side apparatus on a computer network for leveraging real-time sales volume for conducting group buys, the apparatus comprising:

one or more processors; and one or more memories operatively coupled to at least one of the one or more processors and having instructions stored thereon that, when executed by at least one of the one or more processors, cause at least one of the one or more processors to:

initialize a sale of an item over the computer network, wherein the sale specifies a current price of the item;

update the current price of the item for a duration of the sale by detecting real-time sales volume of the item on the computer network, wherein the current price is dynamically determined based at least in part on the real-time sales volume and a data structure stored on at least one of the one or more server-side computing devices, the data structure comprising a plurality of sales volume ranges;

process a plurality of transactions with a plurality of users for a plurality of items prior to termination of the sale of the item, wherein a purchase price for each item in the plurality of plurality of items comprises the current price when a purchase request is received from the corresponding user;

terminate the sale of the item based at least in part on one or more of a determination that the current sales volume has reached a predetermined threshold or a determination that a predetermined period of time has passed since the sale was initialized, wherein the current price at termination of the sale comprises the closing price; and credit after processing the plurality of transactions and after termination of the sale of the item, one or more accounts belonging to one or more users in the plurality of users with an additional amount, wherein the additional amount for each account in the one or more accounts is based at least in part on a difference between the closing price and the purchase price for each item for the corresponding user.

13. The apparatus of claim 12, wherein each sales volume range in the plurality of sales volume ranges has a corresponding price and wherein the current price is calculated by:

determining the current sales volume of the item;

identifying a sales volume range in the plurality of sales volume ranges which includes the current sales volume; and setting the current price to the corresponding price for the identified sales volume range.

14. The apparatus of claim 12, wherein at least one of the one or more memories has further instructions stored thereon that, when executed by at least one of the one or more processors, cause at least one of the one or more processors to:

calculate a commission based at least in part on one or more of the sales volume, the purchase price for each item, and a quantity of sales volume ranges;

calculate a seller payment amount based at least in part on one or more of the sales volume, the closing price, and the commission; and transmit the seller payment amount to a seller of the item.

15. The apparatus of claim 14, wherein the instructions that, when executed by at least one of the one or more processors, cause at least one of the one or more processors to calculate a commission further cause at least one of the one or more processors to:

multiply the sales volume by a transaction cost to generate a first product;

multiply each purchase price for each item by a transaction percentage to generate a plurality of second products;

multiply a price reduction cost by a number of price reductions which occurred during the sale to generate a third product; and sum the first product, the plurality of second products, and the third product to generate the commission.

16. The apparatus of claim 14, wherein the instructions that, when executed by at least one of the one or more processors, cause at least one of the one or more processors to calculate a seller payment further cause at least one of the one or more processors to:

multiply the sales volume by the closing price to generate a total sales amount; and subtract the commission from the total sales amount to generate the seller payment amount.

17. The apparatus of claim 12, wherein the item comprises one or more of a product, a service, a coupon for a product or service, and a certificate redeemable with a seller for a product or service.

18. The apparatus of claim 12, wherein detecting real-time sales volume of the item on the computer network comprises aggregating real-time sales volume from a plurality of sources.

19. The apparatus of claim 18, wherein the plurality of sources comprise one or more of: a merchant server communicatively coupled to one or more point-of-sale locations, a social media server, or an ecommerce server.

20. The apparatus of claim 12, wherein detecting real-time sales volume of the item on the computer network comprises:
receiving sales transaction information corresponding to a sale occurring at a point-of-sale location from a mobile device, the point-of-sale location including a beacon configured to transmit a notification to the mobile device instructing a user of the mobile device to enter the sales transaction information.

21. At least one non-transitory computer-readable medium storing computer-readable instructions that, when executed by one or more server-side computing devices on a computer network, cause at least one of the one or more computing devices to:
initialize a sale of an item over the computer network, wherein the sale specifies a current price of the item;
update the current price of the item for a duration of the sale by detecting real-time sales volume of the item on the computer network, wherein the current price is dynamically determined based at least in part on the real-time sales volume and a data structure stored on at least one of the one or more server-side computing devices, the data structure comprising a plurality of sales volume ranges;
process a plurality of transactions with a plurality of users for a plurality of items prior to termination of the sale of the item, wherein a purchase price for each item in the plurality of plurality of items comprises the current price when a purchase request is received from the corresponding user;
terminate the sale of the item based at least in part on one or more of a determination that the current sales volume has reached a predetermined threshold or a determination that a predetermined period of time has passed since the sale was initialized, wherein the current price at termination of the sale comprises the closing price; and
credit after processing the plurality of transactions and after termination of the sale of the item, one or more accounts belonging to one or more users in the plurality of users with an additional amount, wherein the additional amount for each account in the one or more accounts is based at least in part on a difference between the closing price and the purchase price for each item for the corresponding user.

22. The at least one non-transitory computer-readable medium of claim 21, wherein each sales volume range in the plurality of sales volume ranges has a corresponding price and wherein the current price is calculated by:
determining the current sales volume of the item;
identifying a sales volume range in the plurality of sales volume ranges which includes the current sales volume; and
setting the current price to the corresponding price for the identified sales volume range.

23. The at least one non-transitory computer-readable medium of claim 21, further storing computer-readable instructions that, when executed by at least one of the one or more computing devices, cause at least one of the one or more computing devices to:
calculate a commission based at least in part on one or more of the sales volume, the purchase price for each item, and a quantity of sales volume ranges;
calculate a seller payment amount based at least in part on one or more of the sales volume, the closing price, and the commission; and
transmit the seller payment amount to a seller of the item.

24. The at least one non-transitory computer-readable medium of claim 23, wherein the instructions that, when executed by at least one of the one or more computing devices, cause at least one of the one or more computing devices to calculate a commission further cause at least one of the one or more computing devices to:
multiply the sales volume by a transaction cost to generate a first product;
multiply each purchase price for each item by a transaction percentage to generate a plurality of second products;
multiply a price reduction cost by a number of price reductions which occurred during the sale to generate a third product; and
sum the first product, the plurality of second products, and the third product to generate the commission.

25. The at least one non-transitory computer-readable medium of claim 23, wherein the instructions that, when executed by at least one of the one or more computing devices, cause at least one of the one or more computing devices to calculate a seller payment further cause at least one of the one or more computing devices to:
multiply the sales volume by the closing price to generate a total sales amount; and
subtract the commission from the total sales amount to generate the seller payment amount.

26. The at least one non-transitory computer-readable medium of claim 21, wherein the item comprises one or more of a product, a service, a coupon for a product or service, and a certificate redeemable with a seller for a product or service.

27. The at least one non-transitory computer-readable medium of claim 21, wherein detecting real-time sales volume of the item on the computer network comprises aggregating real-time sales volume from a plurality of sources.

28. The at least one non-transitory computer-readable medium of claim 27, wherein the plurality of sources comprise one or more of: a merchant server communicatively coupled to one or more point-of-sale locations, a social media server, or an ecommerce server.

29. The at least one non-transitory computer-readable medium of claim 21, wherein detecting real-time sales volume of the item on the computer network comprises:
receiving sales transaction information corresponding to a sale occurring at a point-of-sale location from a mobile device, the point-of-sale location including a beacon configured to transmit a notification to the mobile device instructing a user of the mobile device to enter the sales transaction information.

* * * * *